United States Patent
Fok et al.

(10) Patent No.: US 8,966,386 B2
(45) Date of Patent: Feb. 24, 2015

(54) METHOD FOR ENABLING A MOBILE USER EQUIPMENT TO DRAG AND DROP DATA OBJECTS BETWEEN DISTRIBUTED APPLICATIONS

(75) Inventors: Frederick Ah Chuen Fok, Reading (GB); Nicolas Delabarre, Reading (GB)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 1119 days.

(21) Appl. No.: 12/995,918

(22) PCT Filed: Jun. 1, 2009

(86) PCT No.: PCT/JP2009/060400
§ 371 (c)(1),
(2), (4) Date: Dec. 2, 2010

(87) PCT Pub. No.: WO2009/148172
PCT Pub. Date: Dec. 10, 2009

(65) Prior Publication Data
US 2011/0099497 A1    Apr. 28, 2011

(30) Foreign Application Priority Data

Jun. 4, 2008  (EP) .................................... 08157603

(51) Int. Cl.
G06F 3/048     (2013.01)
H04L 29/08     (2006.01)
G06F 3/0486    (2013.01)
H04W 28/04     (2009.01)
H04W 28/18     (2009.01)

(52) U.S. Cl.
CPC ............ *H04L 67/06* (2013.01); *G06F 3/0486* (2013.01); *H04L 67/08* (2013.01); *H04L 67/04* (2013.01); *H04L 67/142* (2013.01); *H04W 28/04* (2013.01); *H04W 28/18* (2013.01); *H04L 67/36* (2013.01); *H04L 67/14* (2013.01)
USPC .......................................................... 715/769

(58) Field of Classification Search
CPC ...................................................... G06F 3/0486
USPC .......................................................... 715/769
See application file for complete search history.

(56) References Cited

U.S. PATENT DOCUMENTS

| | | | | |
|---|---|---|---|---|
| 7,227,873 | B2 * | 6/2007 | Lehtimaki | 370/467 |
| 7,533,349 | B2 * | 5/2009 | Saul et al. | 715/769 |
| 7,733,785 | B2 * | 6/2010 | Andreev et al. | 370/238 |
| 7,802,195 | B2 * | 9/2010 | Saul et al. | 715/769 |

(Continued)

FOREIGN PATENT DOCUMENTS

| | | |
|---|---|---|
| JP | 11-004225 A | 1/1999 |
| JP | 2003-078547 A | 3/2003 |
| WO | 2007/142708 A1 | 12/2007 |

*Primary Examiner* — William Bashore
*Assistant Examiner* — Henry Orr
(74) *Attorney, Agent, or Firm* — Sughrue Mion, PLLC (57) ABSTRACT

The invention concerns a system and a method for enabling a mobile User Equipment (81) to drag and drop data objects between at least two remote applications (7, 9) or between a local application (2) and a remote application (7, 9), the system including a Drag Source (10), a Drag Target (12), a Drop Source (14), and a Drop Target (16). In the system according to the invention, the Drag Source (10) is configured for negotiating with the Drag Target (12) a transmission protocol (38, 32, 100, 102, 104) for exchanging said data object between said Drop Source (14) and said Drop Target (16).

7 Claims, 7 Drawing Sheets

(56) References Cited

U.S. PATENT DOCUMENTS

| | | | |
|---|---|---|---|
| 2003/0031200 A1* | 2/2003 | Lehtimaki | 370/467 |
| 2006/0041431 A1* | 2/2006 | Maes | 704/270.1 |
| 2006/0069797 A1* | 3/2006 | Abdo et al. | 709/231 |
| 2006/0070007 A1* | 3/2006 | Cummins et al. | 715/769 |
| 2006/0115008 A1* | 6/2006 | Standish et al. | 375/257 |
| 2007/0063037 A1* | 3/2007 | Silverbrook et al. | 235/432 |
| 2007/0157101 A1 | 7/2007 | Indiran et al. | |
| 2007/0234226 A1 | 10/2007 | Szeto | |
| 2008/0092181 A1* | 4/2008 | Britt | 725/87 |
| 2008/0181259 A1* | 7/2008 | Andreev et al. | 370/519 |
| 2009/0106662 A1* | 4/2009 | Ye et al. | 715/740 |
| 2009/0248802 A1* | 10/2009 | Mahajan et al. | 709/204 |

* cited by examiner

METHOD FOR ENABLING A MOBILE USER EQUIPMENT TO DRAG AND DROP DATA OBJECTS BETWEEN DISTRIBUTED APPLICATIONS

TECHNICAL FIELD

The invention pertains to telecommunication field and concerns a system and a method for enabling a mobile user equipment to drag and drop data objects between at least two remote applications or between a local application and a remote application.

The invention concerns also a User Equipment and a system adapted for implementing said method.

BACKGROUND ART

In traditional computing network systems, Thin Clients are usually client computer or client software in a client-server architecture wherein a central server actions activities such as desktop applications and wherein a web browser or a remote desktop software runs on the thin client device. Because application logic is handled by the Server there are many Thin Client advantages such as reducing IT maintenance and administration costs, enhanced data and system security, and reduced power consumption.

We can distinguish two main types of Thin Client System.

The first type is a WebTop System (for "Web" and "Desktop") or WebOS {Web Operating System) which enables the user to interact with the web equivalent of a desktop. The applications and documents associated to a user are gathered to create a page representing this information. Web services scripting Application Programming Interface (API) such as SOAP-XML (Simple Object Access Protocol-Extensible Markup Language) are the main technologies used.

The second type is a Screen Top System, (for "screen" and "Desktop"), wherein a remote administration software allows Graphical User Interface applications to be run remotely on a server while being displayed locally on the user's device. Thin Clients protocols such as ICA (Independent Computing Architecture) RDP (Remote Desktop Protocol), RFB (Remote Frame Buffer), or even AIP (Adaptive Internet Protocol) are main protocols used in order for a server to remotely control the screen display of a user's device.

One main issue in deploying Thin Client technology is to know whether an application should be local (i e resident), remote, or both Because when no more network connection is available in mobility context applications, such a phone book, a media player or any other resident applications would be no more available. Consequently, those applications and data should be duplicated locally on the device memory and remotely on e.g. a corporate network server.

In order to alleviate the data duplication problems, standardized synchronization technologies are provided such as in OMA Device Management (Open Mobile Alliance), OMA Data synchronization and OMA Client Provisioning Working Group.

Moreover, it is foreseen that a mobile device will have both resident applications—that can still be locally used even when having no network connection—and remote desktop applications (i.e. screen Top) to access office or specific enterprise applications or even home personal applications.

A drag-and-drop is performed when a user selects one or more graphical objects and drags this selection using a pointing device (for instance a mouse, a trackball, a touch-based interface) and then release the pressure to perform a drop of the object(s). Basically the window in which the pointing device points receives a message notifying a drop operation and the object to be transferred and preferably a description of the object.

Generally, the data to be transferred is stored in a clipboard in appropriated format therefore requiring potential conversion. Such clipboard is usually encapsulated into a file or a group of files.

The existing solutions based on a shared clipboard present interoperability and synchronization limitations. On the one hand they do not enable to negotiate the format of the data to be dragged and dropped. On the other hand they are often tight to specific implementations and dependent upon the Operating System. Besides they are often used for text-based object rather than files or directories as the shared clipboard becomes more complex to manage with huge amount of data.

Moreover, the existing solutions can be used between a local and a remote application but are not applicable in the case of drag-and-dropping action between remote applications.

Patent application WO 2007/142708 A1 discloses a method for dropping data object of low size (e.g. text message) over the currently established terminal service session between a client component and a server component. This method is bound to the remote procedure call (RFC) of the object and does not enable to exchange the data using different data transfer means (e.g. file transfer, streaming, . . . ), and is tight to the two devices involved in the session. Actually, large data file may require other more suitable protocol depending on the desired dropping action.

The present invention proposes a drag-and-drop approach that overcomes the above drawbacks.

DISCLOSURE OF THE INVENTION

The exemplary object of the invention is achieved by means of a system using a distributed communication protocol that distinguishes the Drag Source from the Drop Source as well as the Drag Target from the Drop Target.

In the following description and in the claims, a Data Object consists of Dragged Data Object and Dropped Data Object. Dragged Data Object is defined as the description of at least one object (e.g. an icon representative of a file or a directory or any widgets such as a button or a form, a text selection, or an application window) that will be dropped. Dropped Data Object is defined as the raw data object (s) associated to the Dragged Data Object, sent to the Drop Target upon the action by the user of dropping said Dragged Data Object into the Drag Target. More than one raw data Objects can be associated to one Dragged Data Object so said action of dropping can lead to the transmission of one or more of the possible raw data objects having potentially different types (e.g. video file, text . . . ). A Drag Source owns said Dragged Data Object and is defined as the Initiator of the drag-and-drop communication protocol. A Drag Target is defined as the receiver of said Dragged Data Object. A Drop Source is defined as the drop element configured by the Drag Source and that sends the Dropped Data Object using appropriate data transfer mechanism, and a Drop Target represents the drop element that receives the Dropped Data Object. A Drag-Drop-Proxy is defined as the element that acts as a proxy forwarding drag-and-drop signaling without modification of the messages (stateless proxy) or inspecting the messages, modifying the messages to include itself in the communication path used to exchange the Dropped Data Object, and forwarding the modified messages (statefull proxy).

An in-the-band transmission refers to the transmission of the Dropped Data Object within the drag-and-drop communication protocol while an out-of-the-band refers to the transmission of the Dropped Data Object in a different channel than the one in which is transferred the Dragged Data Object. For instance the Dropped Data Object can be sent in a separate user data channel. The separate channel can be an end-to-end data pipe wherein a File Transfer Protocol is used over potentially a different Radio Access Network technology (e.g. a WiFi access network interface, a Cellular network access interface, or a Bluetooth access network interface, . . . ).

The exemplary object of the invention is reached by means of a system for enabling a mobile user equipment to drag and drop data objects between at least two remote applications, or between a remote application and a local application, wherein said system comprises a Drag Source, a Drag Target, a Drop Source, and a Drop Target and wherein the Drag Source is configured for negotiating with the Drag Target a transmission protocol for exchanging said Dropped Data Object between said Drop Source and said Drop Target.

BRIEF DESCRIPTION OF THE DRAWINGS

The forgoing summary, as well as the following detailed description, will be better understood when read in conjunction with the appended figures illustrating an exemplary embodiment of the invention in which:

FIG. 10 is a schematic illustration of the steps described by FIG. 8, FIG. 11 schematically illustrates an example illustrates an application of the invention in which a client device is connected to a first remote desktop applications running in a first mobile device and a second remote desktop applications running in a second mobile device, FIG. 12 schematically illustrates the dropping of a video file to a local video player in a mobile UE, and FIG. 13 schematically illustrates a possible path to implementation using the Remote Frame Buffer Protocol.

BEST MODE FOR CARRYING OUT THE INVENTION

Figure 1:
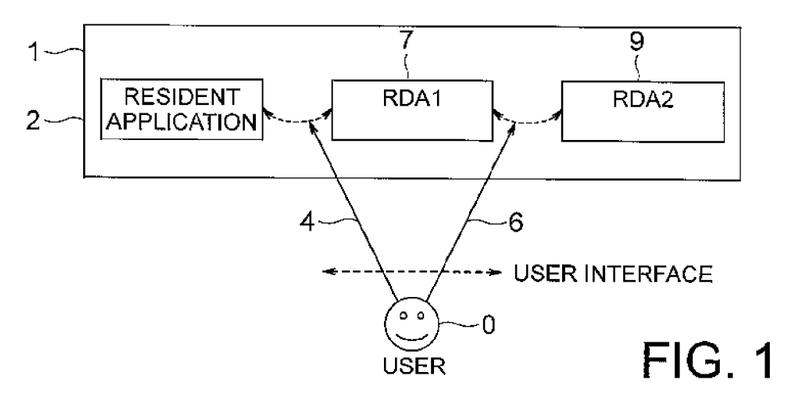
FIG. 1 schematically illustrates a UE Thin Client Screen display comprising a resident application 2, a first and second remote desktop applications, FIG. 2, schematically illustrates a drag-and-drop system according to the invention, FIG. 3 schematically illustrate a general protocol message sequence used in the system of FIG. 2, FIG. 4, schematically represents a drag-and-drop action of an object from remote to a local application in a first exemplary embodiment of the invention, FIG. 5 schematically illustrates drag-and-drop action of an object from a local to a remote application in a second exemplary embodiment of the invention, FIG. 6, schematically illustrate drag-and-drop action of an object from remote to a remote application in a preferred exemplary embodiment of the invention.

FIG. 1 schematically illustrates a UE Thin Client Screen display 1 comprising a resident application 2, a first and second remote desktop application RDA1 7 and RDA2 9 delivered to the UE respectively by a first Thin Client server 51 and a second thin client server S2 not represented.

The user 0 can drag-and-drop a virtual data object from a resident application 2 to a first remote desktop application 7 (respectively from RDA1 7 to a resident application 2) (arrow 4) or can drag-and-drop a virtual data object between said first and second remote desktop applications RDA1 7 and RDA2 9 (arrow 6).

Figure 2:
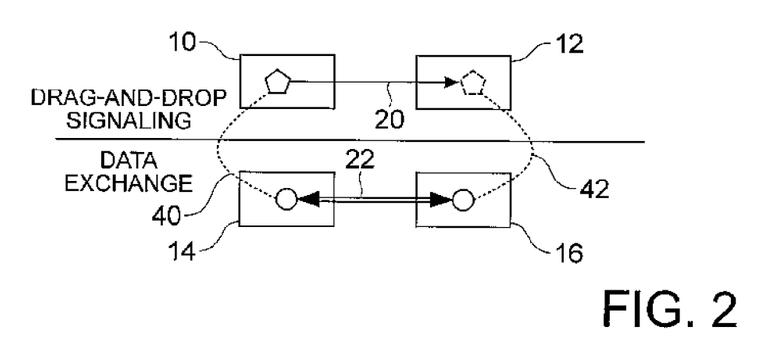

FIG. 2 illustrates an overview of the logical concept of a client-server architecture network comprising a Drag Source 10, a Drag Target 12, a Drop Source 14, and a Drop Target 16.

As shown in this FIG. 2, the drag-and-drop signaling is exchanged between Drag Source 10 and Drag Target 12 via a first channel 20, while the data objects are exchanged between Drop Source 14 and Drop Target 16 via a second channel 22 different from the first channel 20.

It is to be noted that the logical separation of channel 20 and channel 22 does not prevent that Drag Source 10 and Drop Source 14 (respectively Drag Target 12 and Drop Target 16) to be hosted in the same physical device. Nevertheless this architecture enables those elements to be in separate entities thereby enabling new business models, new use cases and capabilities.

Figure 3:
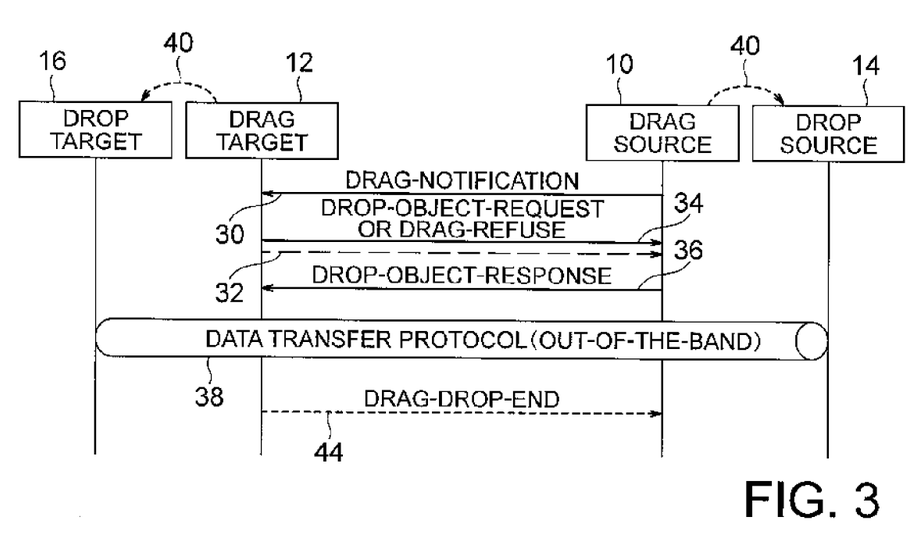

FIG. 3 illustrates a generic communication protocol used between the entities involved in a drag-and-drop of Data Object operation comprising the following messages:

A DRAG-NOTIFICATION 30 sent by the Drag Source 10 to the Drag Target 12 to notify said Drag Target 12 to handle the drag of an object selection (i.e. the Dragged Data Object). Preferably the DRAG-NOTIFICATION 30 includes a description of the object(s) of the selection, and further a graphical representation of said object. The graphical information enables the Drag Target 12 to visually render the drag object with the cursor graphical effect. The description of the object(s) enables the Drag Target 12 to register the location information of drag object and its properties (e.g. a list of supported format) which can further enable automatic selection of application if no specific application is pointed by the pointing device (i.e. this is so called in present invention as a "precise-less feature"). The DRAG-NOTIFICATION 30 can further include a list of actions supported by the Drag Source 10.

A DRAG-OBJECT-REFUSE 32 or a DROP-OBJECT-REQUEST 34:

The DRAG-OBJECT-REFUSE 32 is returned to the Drag Source 10 in response to a DRAG-NOTIFICATION 30 if the Drag Target 12 cannot handle (or refuse to handle) the drag-and-drop operation.

The DROP-OBJECT-REQUEST 34 is returned by the Drag Target 12 to the Drag Source 10 in response to the DRAG-NOTIFICATION 30 when the Dragged Data Object is dropped in the Drag Target 12. It includes the object identifier and the preferred data transfer mechanism. It also includes an action selected by the Drag Target 12. Such as a copy of an object, an alias of an object, a copy and the deletion of an object, or a stream transmission of an object, etc. . . . This enables the Drag Source 10 to perform more accurate actions during and after the dropping of the object. If no action is specified by the Drag Target 12 then the Drag source 10 shall undertake a default action which can be a copy of an object A DROP-OBJECT-RESPONSE 36 returned to the Drag Target 12 upon reception of a DROP-OBJECT-REQUEST 34.

This message includes either the requested data in-the-band or the data exchange protocol and the required associated parameters (e.g. IP addresses and port number). The Drag Source 10 therefore configures (arrow 40) the Drop Source 14 based on selected data exchange protocol 38 and the Drag Target 12 configures (arrow 42) the Drop Target 16 to receive the data. In a particular embodiment of the invention, the DROP-OBJECT-RESPONSE 34 further includes license information associated to the action of "a stream transmission of an object" thereby enabling a DRM agent in the Drop Target to play back a video stream from a Drop Source.

A DRAG-DROP-END 44 that signals the completion of the drag-and-drop operation between Drag Source 10 and Drag Target 12. An indication is provided in this message that notifies whether Dropped Data Object transfer is completed because this message may not always relate to the end of the Dropped Data Object transmission. In a particular exemplary embodiment this DRAG-DROP-END message may be sent while a video is still being streamed just to notify that everything is working well. Nevertheless in some situation such as a "move action" dropping result, the Drag Target 12 sends the DRAG-DROP-END message to notify that the Dropped Data Object has been received and that it can be removed by the Drag Source 10 and/or Drop Source 14.

It is to be noted that those messages (30-44) can be combined with existing thin client protocol messages for accurately handling the drag-and-drop and further drag-and-drop messages may be added to ensure accurate drag-and-drop operation. So, an acknowledgment message in response to a drop-object-request 34 can be sent by the Drag Source 10 to the Drag target to avoid blocking until reception of a drop-object-response 36 as the request may take times to complete. Also the Drag Source may cancel the drag-and-drop operation, and as such it can send either a drop-object-refuse message (not represented in the figure) or a "refuse" indication in said acknowledgment message to cancel the drag-and-drop operation. For instance the Drag-notification message 30 results from a mouse button pressure event followed by an extension of movement event, the release of a button event triggering the drop-object-request message if the cursor is within the boundary of the Drag Target window.

Figure 4:
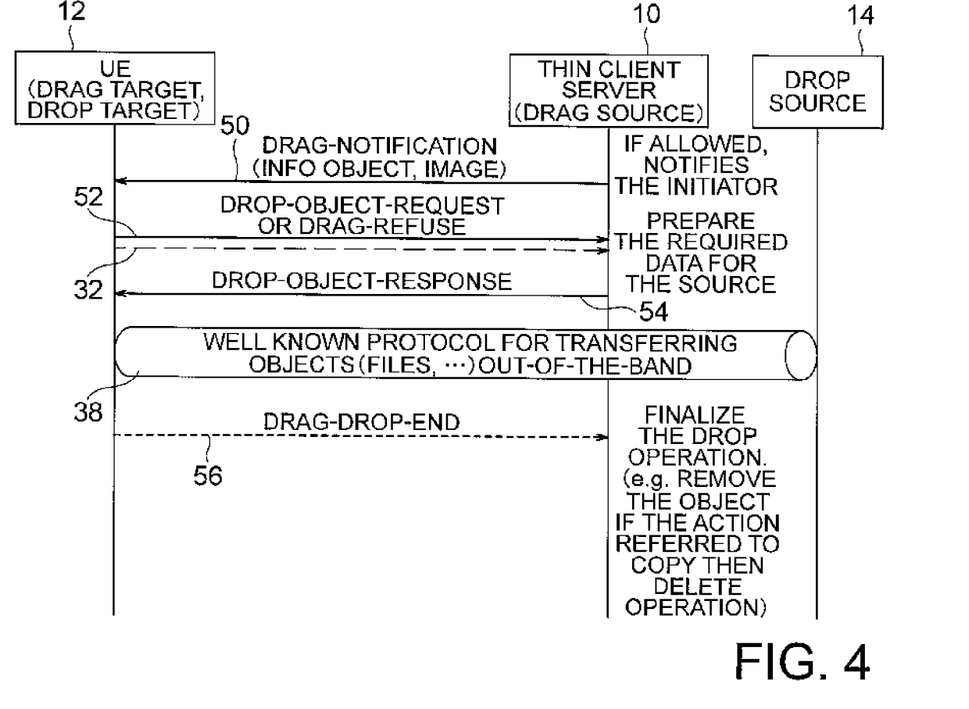

FIG. 4 illustrates a first exemplary embodiment of the invention in which a data object is drag-and-dropped from remote Drag Source application located in a thin client server 10 to a local Drag Target application located in a UE 12. The drag-and-drop signaling is preferably transported over the already established bearer or connection allocated for the Thin Client protocol (e.g. Remote Desktop Protocol, independent Computing Architecture, Remote Frame Buffer).

As shown in FIG. 4, at step 50, the Drag Source 10 transmits to the Drag Target 12 a Drag Notification message in order to request the UE to handle the dragging of the selected object(s). Such notification provides information about the object (graphical representation, list of supported data format, object properties, supported actions).

At step 52, the Drag Target 12 sends a drop-object-request message or a drag-refuse message. Said Drop-object-request enables the Drag Source 10 to initiate the transfer of the requested object from said thin client server. The following information is included in said Drop-object-request:

The identification and the selected format of the Dragged Data Object including the necessary information for the Drag Source 10 to understand which object needs to be dropped (e.g. a region such as display coordinates [x, y], or an object ID). The selected format of an object is preferably sent, for instance in the form of MIME format.

The requested action on the object. For instance it can indicate whether it is a copy or a move (copy then delete) operation, or a video stream delivery. It will be appreciated that the Drag Source 10 device may have several actions associated to a Dragged Data Object. If none is specified by the Drag Target 12, the Drag Source 10 shall perform a default action (for instance "copy the object").

The preferred data transfer mechanisms. The data object can be provided in-the-band or out-of-the-band using appropriate protocol. For instance a file object can be transferred using File Transport Protocol (FTP).

At step 54, the thin client server 10 sends to the UE a drop-object-response with the selected data transfer mechanism. The data object can be sent within the response itself (in-the-band) or out-of-the-band using a well-known protocol (e.g. File Transfer Protocol, Real-time Transport Protocol). In the later case the response includes the required protocol parameters (server address or domain name, port number . . . ). This enables the Drag Source 10 to configure (arrow 40) the Drop Source 14 to receive the data object. The Drag Source 10 may send back an ACK message (not represented) before sending the drop-object-response in order to avoid blocking the Drag Target 12 since the configuration of the Drop Source 10 may take time to complete.

Upon completion of the data transfer, a drag-drop-end message 56 is sent to cleanly end the drag-and-drop operation. Depending on the action such as a "move operation" this can lead to the deletion of the object. It will be appreciated that sending this message may not necessarily means that the data exchange is completed so it is up to the implementation to carefully handle the drag-and-drop completion and an indication is provided in the drag-drop-end message to notify the Drag Source 10 whether the transfer of the Dropped Data Object is completed or not. For example if an video object is streamed to the UE the Drag Source might not wait for the end of the stream and other drag-and-drop can run in parallel.

According to a particular feature of the invention, the data object information sent in the drag-notification message enables the Drag Target 12 to automatically identify the appropriate application, and the action to perform with this object. Advantageously the information can further include a 'tag' identification representative of a specific application (phone book, calendar, text editor application . . . ) so that the Drop Target can automatically store the object more accurately. Such tag can be implemented in the form of a Uniform Resource Identification.

Figure 5:
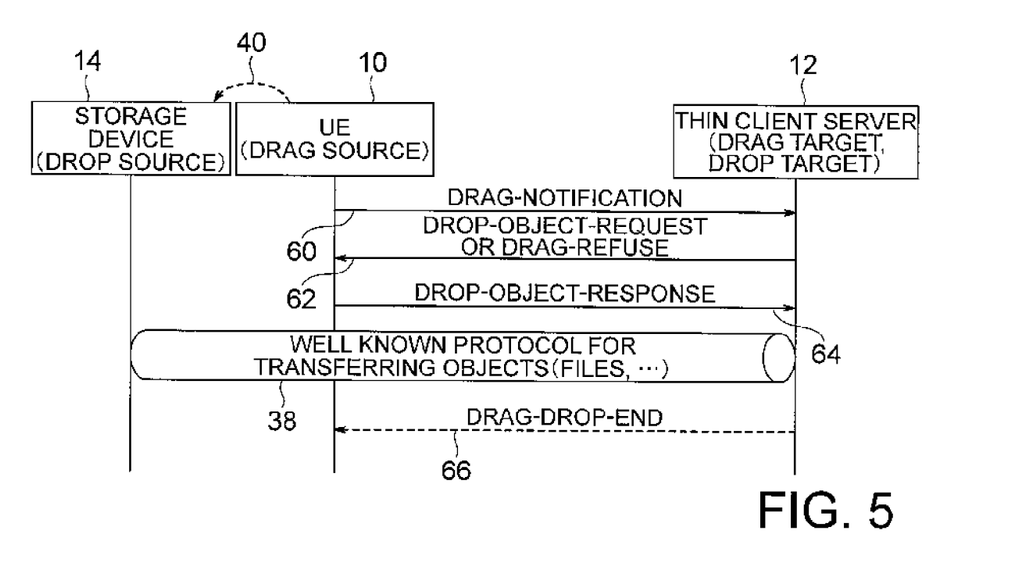

FIG. 5 illustrates a second exemplary embodiment of the invention in which a data object is drag-and-dropped from local Drag Source application 10 located in a UE to a remote Drag Target application 12 located in a thin client server. The drag-and-drop signaling is preferably transported over the already established bearer or connection allocated for the Thin Client protocol (e.g. RDP, ICA, RFB).

At step 60, the Drag Source 10 transmits to the Drag Target 12 a Drag Notification message in order to request the thin client server 12 to handle the dragging of the data objects selected by the user 0. Such notification provides information about the selected object (graphical representation, list of supported data format, object properties, supported actions)

At step 62, the Drag Target 12 sends a drop-object-request message or a drag-refuse message to the Drag Source 10. The drop-object-request message initiates the transfer of the requested object from the UE 10 to the thin client server 12.

The following information is included in said Drop-object-request:

The Dragged Data Object identifier and desired format including the necessary information for the Drag Source 10 to understand which object needs to be Dropped (e.g. a region such as display coordinates [x,y], or an object ID). The selected format of an object is preferably sent, for instance in the form of MIME format.

The requested action on the object. For instance it can indicate whether it is a copy or a move (i.e. copy then delete) operation, or a video stream delivery. It will be appreciated that the Drag Source 10 device may have several actions associated to a Dragged Data Object. If none is requested by the Drag Target 12, the Drag Source 10 shall provide a default action (for instance "copy the object").

The preferred data transfer mechanisms. Such indication enables the data object to be provided in-the-band or out-of-the-band using appropriate protocol. For instance a file object can be transferred using File Transport Protocol (FTP).

At step 64, the UE sends to the thin client server a drag-object-response message with the selected data transfer mechanism. The data object can be sent within the response itself (in-the-band) or out-of-the-band using a well-known protocol (e.g. FTP). In the later case the response includes the required protocol parameters (server address or domain name, port number . . . ). This enables the Drag Source 10 to configure (arrow 40) the Drop Source 14 to receive the data object. The Drag Source 10 may send back an ACK message (not represented in the figure) before sending the drag-object-response in order to avoid blocking the Drag Target 12 since the configuration of the Drop Source 10 may take time to complete. In a particular embodiment, the storage device 14 is a Universal Subscriber Identification Module (USIM) that has its own processing unit. The USIM stores the Dropped Data Object and handles the transmission of this object to the Thin Client Server 12. The UE 10 communicates with the USIM 14 through SIM Interface. Thus in one particular case of use the user 0 is able to drag and drop an object from the USIM to the Thin Client Server.

Upon completion of the data transfer, a drag-drop-end message 66 is sent to cleanly end the drag-and-drop operation. Depending on the action such as a "move operation" this can lead to the deletion of the object. It will be appreciated that sending this message may not necessarily means that the data exchange is completed so it is up to the implementation to carefully handle the drag-and-drop completion. For example if an video object is streamed to the UE the Drag Source might not wait for the end of the stream and other drag-and-drop can run in parallel.

Figure 6:
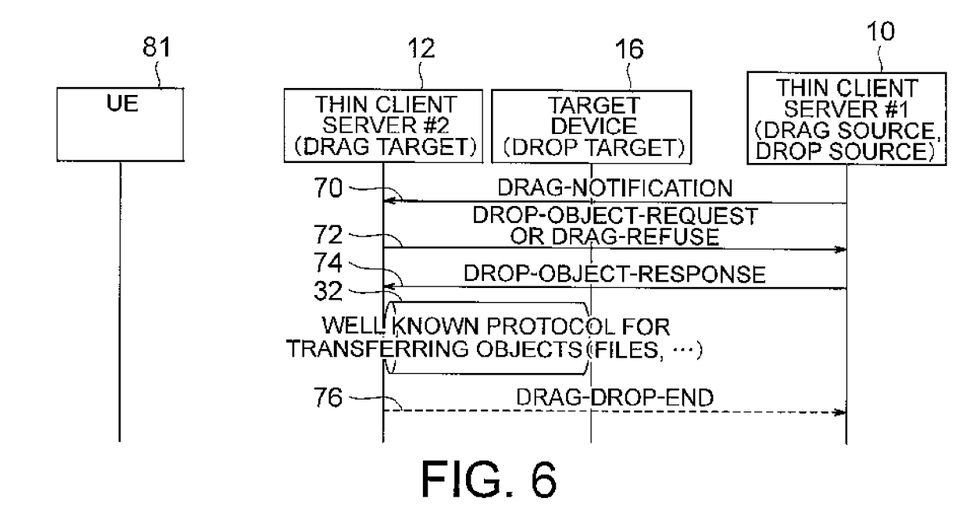

FIG. 6 illustrates a third exemplary embodiment of the invention in which a data object is drag-and-dropped from a first remote drop source application 10 located in a first thin client server to remote drag target application 12 located in a second thin client server. The drag-and-drop signaling is preferably transported over the already established bearer or connection allocated for the Thin Client protocol (e.g. RDP, ICA, RFB . . . ).

At step 70, the Drag Source 10 transmits to the Drag Target 12 a drag-notification message in order to request the transfer of the object(s) from the first thin client server (acting as Drag Source 10) to the second thin client server (acting as Drag Target 12). Such notification provides information about the object (graphical representation, list of supported data format, object properties, supported actions).

At step 72, the Drag Target 12 sends a drop-object-request or a drag-refuse to the Drag Source 10. The drop-object-request message initiates the transfer of the requested object from the first thin client server (acting as Drag Source 10) to the second thin client server (acting as Drag Target 12).

The following information is included in said Drop-object-request:

The Dragged Data Object identifier and desired format including the necessary information for the Drag Source 10 to understand which object needs to be dropped (e.g. a region such as display coordinates [x,y], or an object ID). The selected format of an object is preferably sent, for instance in the form of MIME format.

The requested action on the object. For instance it can indicate whether it is a copy or a move (copy then delete) operation, or a video stream delivery. It will be appreciated that the Drag Source 10 device may have several actions associated to a Dragged Data Object. If none is specified by the Drag Target 12, the Drag Source 10 shall provide a default action (for instance "copy the object").

The preferred data transfer mechanisms. Such indication enables the data object to be provided in-the-band or out-of-the-band using appropriate protocol. For instance a file object can be transferred using File Transport Protocol (FTP).

At step 74, the first thin client server (acting as Drag Source 10) sends to the second thin client server (acting as Drag Target 12) a Drag-object-response with the selected data transfer mechanism. The data object can be sent within the response itself (in-the-band) or out-of-the-band using a well-known protocol (e.g. FTP). In the later case the response includes the required protocol parameters (server address or domain name, port number . . . ).

Upon completion of the data transfer, a drag-drop-end message 76 is sent to cleanly end the drag-and-drop operation. Depending on the action such as a "move operation" this can lead to the deletion of the object. It will be appreciated that sending this message may not necessarily means that the data exchange is completed so it is up to the implementation to carefully handle the drag-and-drop completion. An indication is therefore provided in the drag-drop-end message to notify whether the transfer of the Dropped Data Object has completed or not. For example if an video object is streamed to the UE the Drag Source 10 might not wait for the end of the stream and other drag-and-drop can run in parallel.

Figure 7:
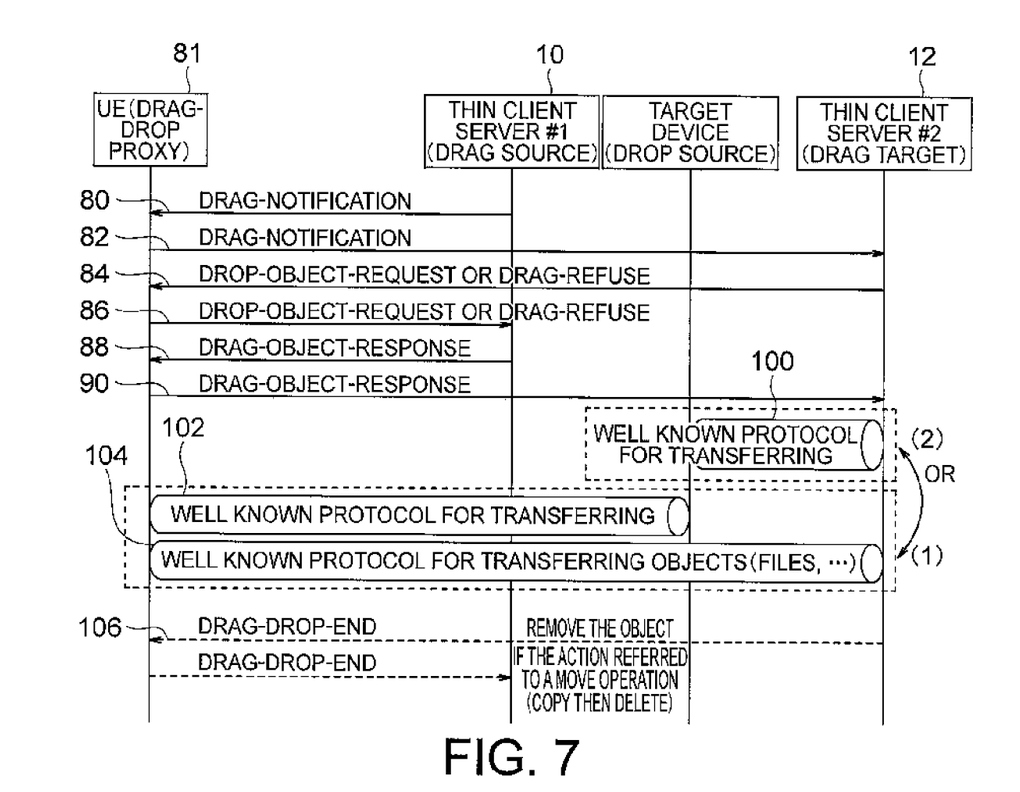
FIG. 7 illustrates two possible proxy configuration of a UE in which the UE may act as a statefull proxy or as a stateless proxy, FIG. 8 schematically illustrates a Drag Source state chart overview according to an exemplary aspect of the invention, FIG. 9 schematically illustrates Drag Target State chart overview according to an exemplary aspect of the invention.

FIG. 7 illustrates two possible proxy configurations of a UE 81 in which the UE 81 may act as a statefull proxy or as a stateless proxy.

In the Statefull mode, the UE acts as a back-to-back agent in the data exchange communication between a first remote application 10 and a second remote application 12 by acting as a proxy Drop Target for the Drop Source 10 and by acting as a proxy Drop Source for the Drag Target 12.

In the Stateless mode, the UE just forwards the drag-and-drop signaling messages. It is unaware of how the object data will be exchanged.

When the UE acts as a drag-and-drop data object proxy in statefull mode, it acts itself as a back-to-back agent within the drag-and-drop signaling to set itself as the receiver for the drop source and as the sender for the drop target.

Referring to FIG. 7, at step 80 the Drag Source 10 transmits to the UE acting as a drag-and-drop data object proxy 81 a Drag Notification in order to request the transfer of the object(s) from the drag source 10 located at a first thin client server to the drag target 12 located at a second thin client server. Such notification provides information about the object (graphical representation, list of supported data format, object properties, supported actions).

At step 82, the UE acting as a drag-and-drop data object proxy 81 forwards said drag-notification message to the drag target 12

At step 84, the Drag Target 12 sends to the UE acting as a drag-and-drop data object proxy 81 a drag refuse or a Drop-object-request message.

The following information is included in said Drop-object-request (84):

The Dragged Data Object identifier and desired format including the necessary information for the Drop Source 14 to understand which object needs to be dropped (e.g. a region such as display coordinates [x,y], or an object ID). The selected format of an object is preferably sent, for instance in the form of MIME format.

The requested action on the object For instance it can indicate whether it is a copy or a move (copy then delete) operation, or a video stream delivery. It will be appreciated that the Drag Source 10 device may have several actions associated to a Dragged Data Object. If none is specified by the Drag Target 12, the Drag Source 10 shall provide a default action (for instance "copy the object").

The preferred data transfer mechanisms. The data object can be provided in-the-band or out-of-the-band using appropriate protocol. For instance a file object can be transferred using File Transport Protocol (FTP).

At step 86, the UE acting as a drag-and-drop data object proxy 81 forwards said Drop-object-request message to the drag source 10.

At step 88, the drag source 10 sends to the UE acting as a drag-and-drop data object proxy 81 a Drag-object-response message with the selected data transfer mechanism.

At step 90, the UE 81 forwards said Drop-object-response message to the drag target 12.

In a first variant of the invention in which the UE acts as stateless drag-and-drop data object proxy, the data exchange is performed end-to-end without necessarily going via the UE at step 100.

In a second variant of the invention in which the UE is as statefull drag-and-drop data object proxy, it acts as a back-to-back agent within the drag-and-drop signaling to set itself as the receiver for the drop source through a first data exchange protocol (step 102) and as the sender for the drop target source through a second data exchange protocol (step 104).

Upon completion of the data transfer, a drag-drop-end message 106 is sent to cleanly end the drag-and-drop operation Depending on the action such as a "move operation" this can lead to the deletion of the object. It will be appreciated that sending this message may not necessarily means that the data exchange is completed so it is up to the implementation to carefully handle the drag-and-drop completion. For example if an video object is streamed to the UE the Drag Source might not wait for the end of the stream and other drag-and-drop can run in parallel.

In a preferred exemplary embodiment the drag-and-dropping operation is configured on the remote and local device with default preferences. For instance it may always refer to a "move operation", or it may always be a "copy operation without deleting the object from its location after being copied". Moreover this can be configured on a per application basis or per user preferences basis.

Figure 8:
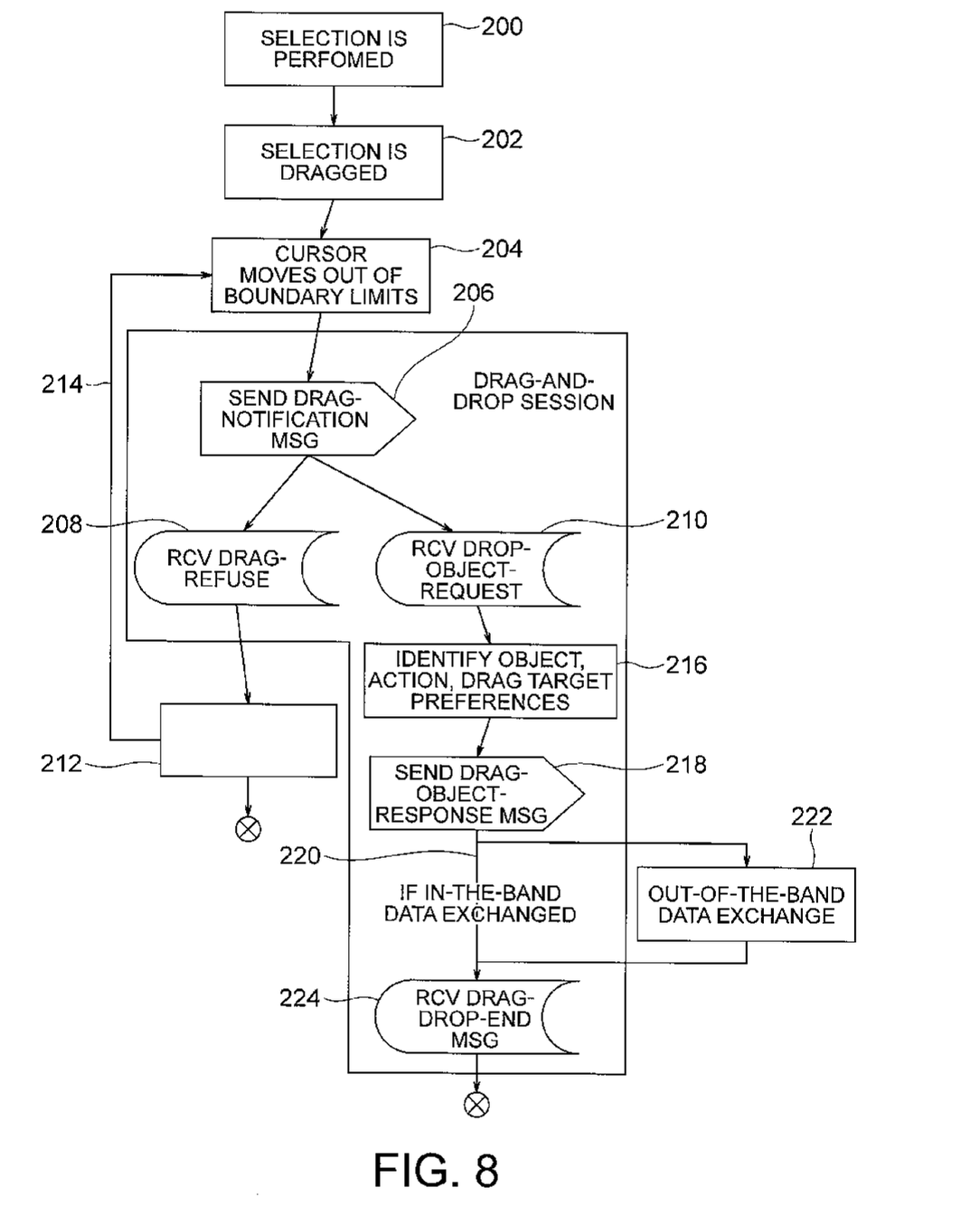

FIG. 8 is a flow chart illustrating a Drag Source state chart overview in a drag-and-drop action in which an object is copied from a resident application to a remote application in a client-server architecture network comprising a Drag Source 10, a Drag Target 12, a Drop Source 14, and a Drop Target 16. At step 200, the user 0 drags an object in a resident application window displayed on the UE acting as a Drag Source 10 and drag (step 202) said object from said resident application to a remote application window also displayed on the UE.

When the resident application detects (step 204) that the cursor is moving from within the boundary limits of said resident application to within boundary limits of the remote application window, the client side of the remote application is notified of this event and sends a drag-notification message (step 206) to the server side of the remote application. The drag-notification message preferably includes a session identifier thereby enabling to start a drag-and-drop session. The notification event includes the data object information (list of available formats, name, author, supported actions, graphical representation of the selection, etc. . . . . . ) and a list of available data exchange protocol (e.g. FTP, RTF, and Trivial FTP). The thin client server acting as a Drag Target 16 registers this event as a "cursor press" combined with "cursor move" event, and updates the display by incorporating the graphical representation with the cursor. The object can be dragged within the remote application. Upon release of the object at the client side (i.e. Drag source 10), a button release event is sent to the server which triggers the Server (i.e. Drag Target 16) to identify the appropriate action and send to the client side either a drag refuse message (step 208) or a drop-object-request message (step 210). The necessary server preferences (for instance including the action to copy the object, and preferably retrieve it using FTP protocol) are embedded in the request and the Client then selects the data transfer mechanism being a file transfer in this embodiment.

In case of a drag refuse message, the drag-and-drop action is resumed (step 212), and the Drag Source is put in monitoring state (step 214) in which it monitors the position of the cursor in the resident application window. Preferably the drag refuse message includes the session number thereby enabling Drag Target and Drag Source to close said drag-and-drop session.

In case of a drop-object-request message, the client sends an acknowledgment (not represented) to the server to inform it that it has received the request and is preparing to respond. As such the client prepares the FTP Server acting as a Drop Source 14 (step 216) and sends to the thin client server 16 (step 218) a Drop-object-response with the necessary parameters (including the FTP Server address and port number or protocol identifier).

The transmission of said Drop-object-response can be in-the-band (step 220) or out-of-the-band (step 222). In this embodiment, an out-of-the band transmission is selected by using a File Transfer Protocol over a predefined data channel.

At step 224, the server responds to the client by a drag-drop-end message notifying that the Drop Target is receiving the file object.

Since the object is copied in a memory area called "clipboard" and identified by an object identifier, the FTP server (drop source 14) can send the requested object upon reception of a FTP client request (drop target 16) by the thin client server.

Figure 9:
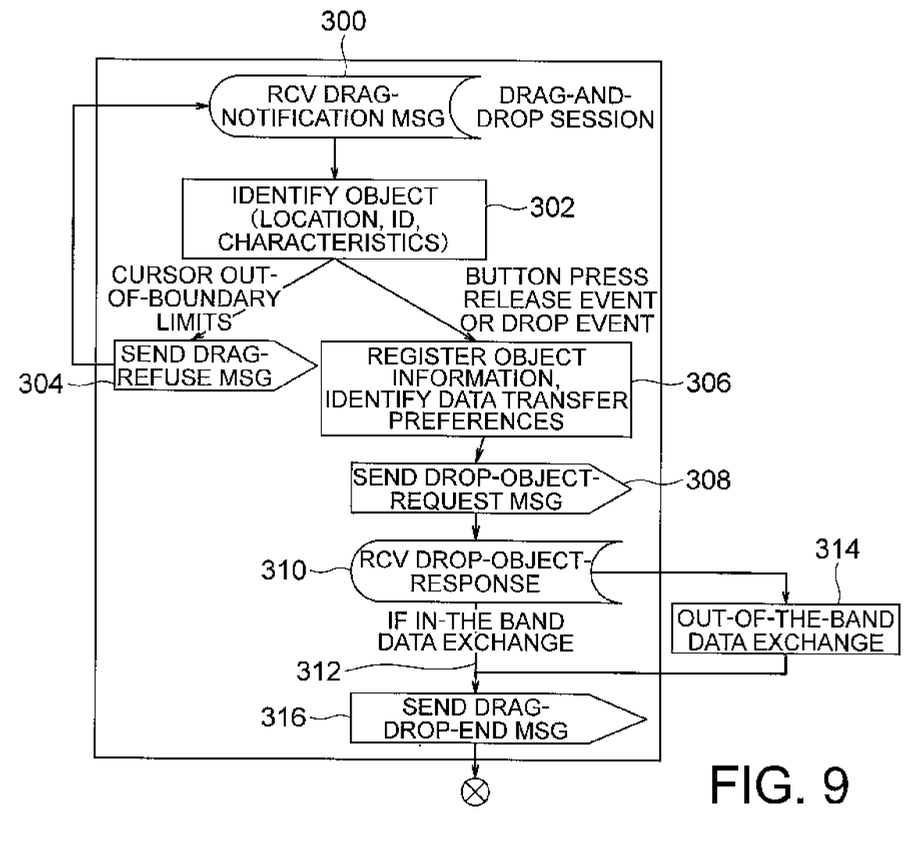

FIG. 9 is a flow chart illustrating a Drag target state chart overview in the drag-and-drop action of FIG. 8.

At step 300, the drag target 12 receives the drag-notification message sent by the drag source. The drag-and-drop session is started.

At step 302, the remote application identifies the object (location, Id, characteristics . . . ).

If the cursor is out of the boundary limits of the remote application window, the drag target 12 sends a drag-refuse message to the drag source (step 304). If the drag target 12 and/or the drop target 16 cannot handle the data object the drag target 12 also sends a drag-refuse message. The drag-and-drop session is closed.

If a drop event is detected, the Drag target 12 register the object information and identify the data transfer preferences (step 306), and sends a drop-object-request message at step 308.

At step 310, the drag source 10 sends (step 310) a drop object response to the drag target 12 in-the-band (step 312) or out-of-the-band (step 314). In a particular embodiment the Drag Target configures a FTP Client (i.e. Drop Target 16) to receive the Dropped Data Object being a file object.

At step 316, the drag target 12 sends a drag-drop-end message to the drag source 10.

Figure 10:
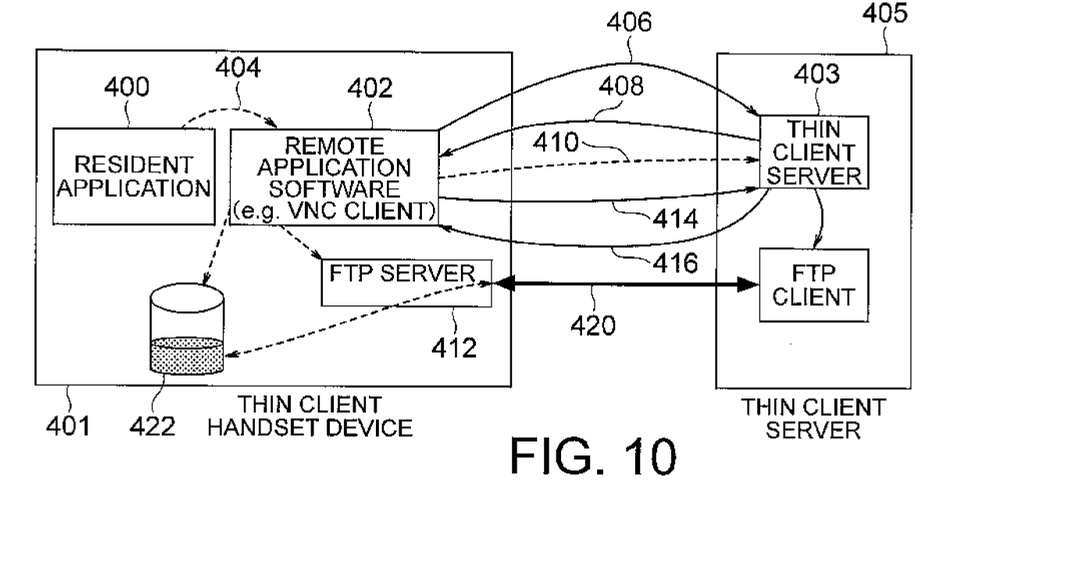

FIG. 10 is a schematic illustration of the steps described by FIG. 8. As shown in this FIG. 10, an object is copied from a resident application 400 located at the client side 401 to a remote application 402 delivered by a thin client server 403 in the server side 405 to the UE through a thin client protocols.

The user 0 drags an object from a resident application (arrow 404).

When the resident application 400 detects that the cursor is moving from within the boundary limits of the resident application to within the boundary limits of the remote application 402, the client side of the remote application 402 is notified of this event and sends a drag-notification message (step 406) to the thin client server 403 of the remote application. Upon release of the object at the client side 401, a release event is sent to the Server side 405 which triggers the thin client server 403 to identify the appropriate action and send a drop-object-request message 408.

The client side 401 sends an acknowledgment 410 to the thin client server 403 to inform it that it has received the request and is preparing to respond. The client side prepares the FTP Server 412 and sends a Drop-object-response 414 with the necessary parameters (including the FTP Server address and port number or protocol identifier). Since the object is copied in a memory area called "clipboard" and identified by an object identifier, the FTP server 412 can send the requested object upon reception of a FTP client request by the thin client server 403.

At step 416, the thin client server 403 sends a drag-drop end to the remote application 402.

At step 420, the data objects are exchanged between the FTP server and the FTP client.

It is to be noted that the copied object in a memory pool 422 area remains locked until it is downloaded by the legitimate thin client server, and is preferably stored in a separate clipboard than the one currently existing in the local machine. Actually, if the copied object referred to a move operation and if the user 0 performs a paste operation on a local application before the thin client server downloads it, this will result in moving the object on the local machine instead of the thin client server. So the copied object should be bound to the operation (move or copy) and bound to the legitimate thin client server to which is destined the object in case of a move operation only. In case of a copy operation, the copied object can remain in the memory pool. It may be copied several times on the same or different thin client server.

Figure 11:
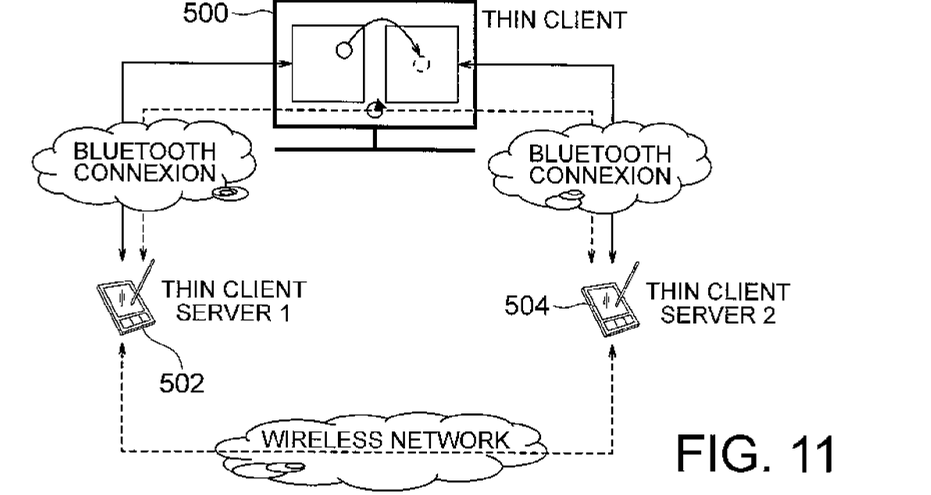

FIG. 11 illustrates an application of the invention in which a client device 500 (PC machine for example) is connected to a first remote desktop applications running in a first mobile device 502 and a second remote desktop applications running in a second mobile device 504 representing respectively a first thin client server and a second thin client server that have a wireless network interface (e.g. WiFi, WiMAX, or 3G). The Mobiles devices are connected using Bluetooth connectivity to the Client device 500. So two client applications are started on the Client device 500 and the thin client servers 502 as well as 504 control the display rendering on their respective allocated application windows. A user 0 can interact with the Client device 500 using mouse and keyboard and can drag object from the first remote application controlled by the Thin Client Server 502 to the second remote application controlled by the second thin client server 504. The Thin Client device 500 can either acts as a statefull drag-drop-proxy and in such case the data object is transferred through said Client device 500 or as a stateless drag-drop-proxy and in such case the transfer of e.g. file object can be performed over the wireless network.

Figure 12:
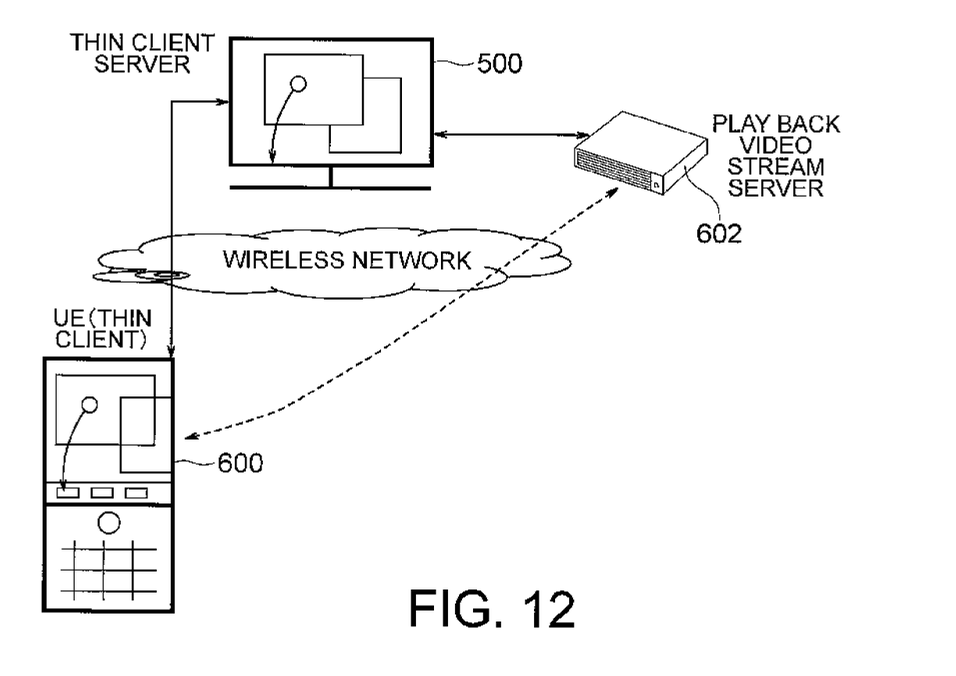

FIG. 12 illustrates the dropping of a video file to a local video player (i.e. the Drop Target) in a mobile UE 600 thereby leading the Thin Client Server 500 to prepare the video stream server (i.e. the Drop Source) and the UE 600 to receive the video stream. The thin client server 500 (i.e. the Drag Source) control the output display in the mobile UE 600 and the user 0 can drag the video file object, according to the invention, from the Remote Application window to the video player icon (Drag Target) which refers to the resident video player (Drop Target). This triggers the video player to start and to receive the video file from a play back video stream server 602.

Figure 13:
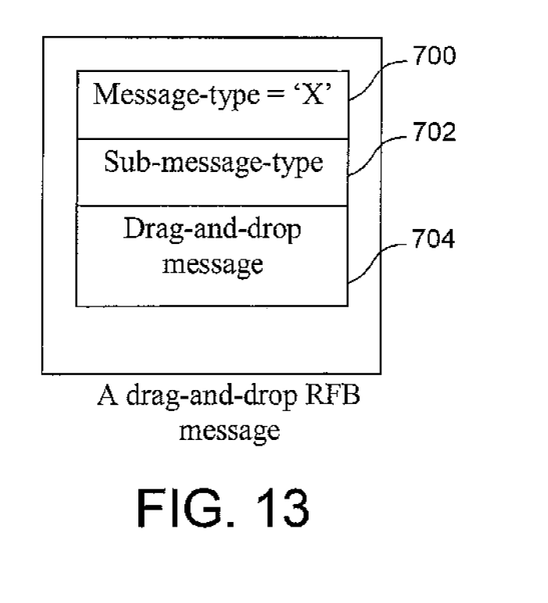

FIG. 13 illustrates a possible path to an implementation using Remote Frame Buffer protocol (RFB). Drag-and-drop messages are associated a message-type number X 700 for both directions (client to server messages or server to client messages). The reason is that both client and server can either be a Drag Source or a Drag Target. 'X' is a new number different than existing message-type numbers that are defined in RFB protocol specification.

| message-type number | Name |
|---|---|
| X | Drag-and-Drop-message |

Each of the drag-and-drop messages of message-type X are differentiated using a sub-message-type 702 as follows:

| Sub-message-Type number | Name |
|---|---|
| 0 | DRAG-NOTIFICATION |
| 1 | DRAG-OBJECT-REFUSE |
| 2 | DROP-OBJECT-REQUEST |
| 3 | DROP-OBJECT-REQUEST-ACK |
| 4 | DROP-OBJECT-RESPONSE |
| 5 | DRAG-DROP-END |

The drag-and-drop message 704 content depends on the sub-message-type 702.

A DRAG-NOTIFICATION drag-and-drop message (sent by Drag Source to Drag Target) includes the following information:

| Information | Description |
|---|---|
| Session ID | Unique identification Number of the session, for instance using unsigned integer. |
| Position | The X position and Y position matching the position of the selected object(s), for instance using Unsigned Integers. |
| Icon | The Image representation of the selected objects, for instance in the form of a Pixel array. |
| Actions | The actions supported by the Drag Source, for instance in the form of a bit array. |

The action bit array can be:

| MSB | | | | | | | LSB |
|---|---|---|---|---|---|---|---|
| FFU | FFU | FFU | s | u | m | a | c |
| 1 byte | | | | | | | |

Where
the 'c' bit refers to a "copy" action
the 'a' bit refers to a "alias" action
the 'm' bit refers to a "move" action
the 'u' bit refers to a "retrieve URI" action
the 's' bit refers to a "stream" action
FFU is reserved For Further Use if other actions is required A DRAG-OBJECT-REFUSE drag-and-drop message (sent by Drag Target to Drag Source) includes:

| Information | Description |
| --- | --- |
| Session ID | Unique identification Number of the session, for instance using unsigned integer. |
| Reason | The explanation why the drag-and-drop is refused, for instance using a format based on LV (Length + string value). |

A DROP-OBJECT-REQUEST drag-and-drop message (sent by Drag Target to Drag Source) includes:

| Information | Description |
| --- | --- |
| Session ID | Unique identification Number of the session, for instance using unsigned integer. |
| Position | The X position and Y position matching the position of the selected object(s). |
| Actions | A list of actions preferred by the Drag Source in priority order, for instance in the form of a bit array (same format as in previous drag-notification's action information). |
| Protocols | A list of protocol supported to receive the Dropped Data Object in an out-of-the-band data channel, for instance implemented using LV format (Length + URI Value). Besides the protocol identifier can be a number as registered by the Internet Assigned Number Authority (IANA). |

A DROP-OBJECT-REQUEST-ACK drag-and-drop message (sent by Drag Source to Drag Target) includes:

| Information | Description |
| --- | --- |
| Session ID | Unique identification Number of the session, for instance using unsigned integer. |
| Cancel indication | An indication whether the session continues or is abandoned, for instance using a Boolean value |

A DROP-OBJECT-RESPONSE drag-and-drop message (sent by Drag Source to Drag Target) includes:

| Information | Description |
| --- | --- |
| Session ID | Unique identification Number of the session, for instance using unsigned integer. |
| Data-transfer-mechanism indication | A flag indicating whether the data is transmitted in-the-band or out-of-the-band, for instance using a Boolean value |
| In-the-band Data | The data type and the data content if the data-transfer-mechanism indication refers to an "in-the-band" transmission |
| Out-of-the-band information | The selected protocol information (including IP address and port number) if the data-transfer-mechanism indication refers to an "out-of-the-band" transmission. It may further contain license information if the action refers to a "stream" |

For example only in case of "retrieve URI" action the In-the-band data information can contain an URI string with a procedure indication (e.g. start a web browser with the URI, store the URI, or make a phone call).

For this specific action, an implementation may use the following format in the in-the-band message:

| URI Information | Description |
| --- | --- |
| URI | URI string (Length + Value) |
| Procedure indication | An procedure indication associated to the URI (e.g. start a browser, store the URI, make a phone call, . . .), for instance by using an integer value |

A DRAG-DROP-END drag-and-drop message includes:

| Information | Description |
| --- | --- |
| Session ID | Unique identification Number of the session, for instance using unsigned integer. |
| Transfer-end-indication | An indication of whether the transfer of the Dropped Data Object is finished, for instance using a Boolean value. |

The system according to the invention enables the data to be exchanged between different entities than the one involved in a drag-and-drop procedure.

According to the invention, the transmission protocol negotiated between the Drag Source and the Drag Target uses either an in-the-band transmission channel or an out-of-the band transmission channel for transmitting Dropped Data Objects from said Drop Source to said Drop Target.

In a first exemplary embodiment of the invention, the mobile user equipment selects a set of objects on a Remote Desktop Application and drops the selected objects into a local application.

In a second exemplary embodiment of the invention, the mobile user equipment selects a set of objects on a first Remote Desktop Application and drops the selected objects into a second Remote Desktop Application. For example, the objects can be dragged from a thin client server at the office to a thin client server at home and vice versa.

In a third exemplary embodiment of the invention, the mobile user equipment selects a set of objects on a local application and drops the selected objects into a Remote Desktop Application.

The Dropped Data Object associated to Said selected objects may be exchanged between entities not necessarily involved in the drag and drop procedure. For example a selected object can be dragged from a thin client server to a mobile User Equipment (i. e. a Dragged Data Object is exchanged) and a video file (i.e. a Dropped Data Object) associated to said selected object can be streamed from a video playback server to the mobile User Equipment.

According to a particular variant of the invention, the Drag Source and the Drop Source are located in the mobile User Equipment, while the Drag Target and the Drop Target are located in a unique remote server.

In another variant, the Drag Source and the Drop Source are located in the mobile User Equipment, while the Drag Target and the Drop Target are distributed in different remote servers.

The method according to an exemplary aspect of the invention is characterized by the fact that the Drag Source and the Drag Target exchange drag-and-drop signaling over a first data channel while the Drop Source and the Drop Target can exchange the data objects over a second data channel different from said first data channel.

Accordingly, the method according to the exemplary aspect of the invention proves advantageous in that the dragand-drop method adopts a distributed approach thereby separating the drag-and-drop control signaling from the drag-and-drop data object exchange.

Moreover, the user is able to interact with both local and remote applications and drag and drop objects as if all objects were on the same device.

The method therefore provides a transparent and similar functionality as traditional copy/paste methods but using different mechanisms and enabling customized dropping results.

In a preferred implementation, the method according to the invention comprises the following steps:

the Drag Source detects that a selected data object moves outside limits of its application window boundaries to within the boundaries of the Drag Target application window. So the Drag Source transmits to the Drag Target a drag-notification to notify to said Drag Target to handle the drag of a selected data object, in response to said drag-notification, the Drag Target responds to the Drag Source either by a DRAG-OBJECT-REFUSE message if the Drag Target cannot handle the drag-and-drop operation or if the Drag Target detects that said selected data object (i.e. Dragged Data Object) is returning to within the boundaries of the Drag Source application window, or by a DROP-OBJECT-REQUEST if the Dragged Data Object is dropped and accepted in the Drag Target application window, upon reception of said DROP-OBJECT-REQUEST, the Drag Source transmits to said Drag Target a DROP-OBJECT-RESPONSE including either the requested data in-the-band or the data exchange protocol along with associated parameters such as IP addresses and port number so that the Drop Target can retrieve the Dropped Data Object from the Drop Source, upon reception of said DROP-OBJECT-RESPONSE the Drag Source configures the Drop Source based on selected data exchange protocol and the Drag Target configures the Drop Target to receive the selected data, the Drag Target transmits the Drag Source a DRAG-DROP-END signal to announce the completion of the drag-and-drop operation between Drag Source and Drag Target.

Other messages can be sent for accurate handling of the drag-and-drop operation. As such the Drag Source may send an acknowledgment message to the Drag Target to avoid blocking the Drag Target; the Drag Source may also abandon the drag-and-drop operation by sending either another message (e.g. a DROP-OBJECT-REFUSE message) or an indication within the acknowledgment message (e.g. a DROP-OBJECT-REQUEST-ACK).

Preferably, said drag-notification comprises a description of the selected data object to enable the Drag Target to register the location information of selected data object and its properties which can further enable automatic selection of application, and a graphical representation of said selected data object to enable the Drag Target to visually render the selected data object in addition to the traditional cursor graphical effect. The drag-notification can further include a list of actions supported by the Drag Source to enable the Drag Target to efficiently select a preferred action. Said action refers to an expected dropping result.

The DROP-OBJECT-REQUEST includes an object identifier, a preferred data transfer mechanism, a description of the preferred action selected by the Drag Target.

The DROP-OBJECT-RESPONSE includes the object identifier, and the selected data transfer mechanism along with potential data exchange protocol parameters. The DROP-OBJECT-RESPONSE further comprises license information associated to the action of a stream transmission of an object to enable a DRM agent in the Drop Target to play back a video stream from the Drop Source.

The method according to an exemplary aspect of the invention comprises a set of possible actions supported by the Drag Source consisting of:

a stream of a selection action to enable said Drop Target to receive a stream of the selection from said Drop Source, a copy of a selection action to enable the drop source to receive a copy of the selected object, an alias of a selection to enable the drop target to receive a link address to the physical data object from the drop source, a move command of a selection which is a copy of a selection action followed by the removal of the selection, a retrieval command of a URI associated to the selection to enable the Drop Source to use said URI and do appropriate procedure using said URI.

In a variant of the invention, the DROP-OBJECT-RESPONSE further comprises license information associated to said action of a stream transmission of an object to enable a DRM agent in the Drop Target to play back a video stream transmitted by the Drop Source.

In a particular implementation, the drag-and-drop messages (i.e. drag-notification, drag-object-refuse, drop-object-request, drop-object-response, drag-drop-end) include a session identification number in order to accurately handle the drag-and-drop session. Both Drag Source and Drag Target can thereby identify the session to which pertain the drag-and-drop messages and start a timer when sending said drag-and-drop messages to avoid blocking situation by discarding said drag-and-drop session.

Advantageously communication errors and malicious attacks can be prevented and multiple drag-and-drop session can run in parallel.

The method according to an exemplary aspect of the invention is implemented by means of a Computer program product stored in a memory storage and adapted, when executed in a computer, for enabling a mobile user equipment to drag and drop data ejects between at least two remote applications, or between a remote and a local applications, in a system comprising a Drag Source, a Drag Target, a Drop Source, and a Drop Target, said computer program comprising:

instructions for enabling a mobile user equipment to drag and drop data objects between at least two remote applications (or between a remote and local application) and to configure itself either as a Drag Source or a Drag Target or both, instructions for enabling the Drag Source to detect a movement of an objects selection outside the boundaries of said Drag Source application window, instructions for enabling the Drag Source to transmits to the Drag Target a drag-notification to notify to said Drag Target to handle the drag of a selected data object (i.e. a Dragged Data Object), instructions for enabling the Drag Target to respond to the Drag Source either by a DRAG-OBJECT-REFUSE if the Drag Target cannot handle the drag-and-drop operation or if the selected data object moves from within the Drag Target application window boundaries to the boundaries of the Drag Source application window, or by a DROP-OBJECT-REQUEST if the Dragged Data Object is dropped and accepted in the Drag Target, instructions for enabling the Drag Source to transmit to said Drag Target a DROP-OBJECT-RESPONSE including either the requested data in-the-band or the data exchange protocol along with associated parameters such as IP addresses and port number to enable the Drop Target to retrieve the Dropped Data Object from the Drop Source. If however the Drag Source wishes to abandon the drag-and-drop operation it sends either another message (e.g. a DROP-OBJECT-REFUSE message) or an indication within an acknowledgment message (e.g. a DROP-OBJECT-REQUEST-ACK message acknowledging the reception of said DROP-OBJECT-REQUEST), instructions for enabling the Drag Source to configure the Drop Source based on selected data exchange protocol and the Drag Target to configure the Drop Target to receive the selected data, instructions for enabling the Drag Target to transmit the Drag Source a DRAG-DROP-END signal to announce the completion of the drag-and-drop operation between Drag Source and Drag Target.

While the invention has been particularly shown and described with reference to exemplary embodiments thereof, the invention is not limited to these embodiments. It will be understood by those of ordinary skill in the art that various changes in form and details may be made therein without departing from the sprit and scope of the present invention as defined by the claims.

This application is based upon and claims the benefit of priority from European patent application No. 08157603.5, filed on Jun. 4, 2008, the disclosure of which is incorporated herein in its entirety by reference.

The invention claimed is:

1. A system configured to enable a mobile User Equipment to drag and drop a data object between at least two remote applications or between a remote application and a local application, the system comprising:
 a hardware processor configured to implement a Drag Source, a Drag Target, a Drop Source, and a Drop Target,
 wherein the Drag Source is configured to negotiate with said Drag Target a transmission protocol for exchanging said data object between said Drop Source and said Drop Target,
 wherein said data object comprises a Dragged Data Object and a Dropped Data Object,
 wherein said Drag Source owns said Dragged Data Object and is an Initiator of a drag-and-drop communication protocol,
 wherein said Drag Target is defined as a receiver of said Dragged Data Object,
 wherein said Drop Source is a drop element configurable by said Drag Source and configured to send said Dropped Data Object using an appropriate data transfer mechanism, and
 wherein said Drop Target is a drop element configured to receive said Dropped Data Object.

2. The system according to claim 1 wherein said transmission protocol uses either an in-the-band transmission channel or an out-of-the band transmission channel for transmitting data objects from said Drop Source to said Drop Target.

3. The system according to claim 2 wherein the mobile User Equipment is configured to select a set of data objects on a Remote Application and to drop the selected data objects into a local application which triggers the exchange of said set of data objects from Drop Source to said Drop Target.

4. The system according to claim 2 wherein the mobile User Equipment is configured to select a set of data objects on a first Remote Application and to drop the selected set of data objects into a second Remote Application.

5. The system according to claim 2 wherein the mobile User Equipment is configured to select a set of data objects on a local application and to drop the selected set of data objects into a remote application.

6. The system according to claim 3 wherein said Drag Source and said Drop Source are located in said mobile User Equipment, while said Drag Target and said Drop Target are either located in a unique remote server or distributed in different remote servers.

7. The system according to claim 6 wherein said Drop Source is a Subscriber Identity Module or a peripheral connected to said mobile User Equipment using wireless or fixed communication interface.

* * * * *